United States Patent
Hashimoto

(10) Patent No.: US 9,710,432 B2
(45) Date of Patent: Jul. 18, 2017

(54) SYSTEM, INFORMATION PROCESSING APPARATUS, AND METHOD OF CONTROLLING DISPLAY

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 423 days.

(21) Appl. No.: 13/936,367

(22) Filed: Jul. 8, 2013

(65) Prior Publication Data

US 2014/0019859 A1    Jan. 16, 2014

(30) Foreign Application Priority Data

Jul. 10, 2012  (JP) ................................ 2012-154922
Jul. 3, 2013   (JP) ................................ 2013-140032

(51) Int. Cl.
    G06F 17/00    (2006.01)
    G06F 17/21    (2006.01)
    (Continued)

(52) U.S. Cl.
    CPC .......... *G06F 17/212* (2013.01); *G06F 3/1285* (2013.01); *G06F 17/243* (2013.01)

(58) Field of Classification Search
    CPC ............................. G06F 3/1285; G06F 3/1237
    See application file for complete search history.

(56) References Cited

U.S. PATENT DOCUMENTS 6,763,346 B1    7/2004  Nishida et al.
7,038,796 B1 *  5/2006  Gupta ................ H04N 1/00209
                                                         358/1.15
(Continued)

FOREIGN PATENT DOCUMENTS

JP    2001-216452    8/2001
JP    2004-234111    8/2004
(Continued)

OTHER PUBLICATIONS

Bajcsy et al., "A Framework for Understanding File Format Conversions," US-DPIF Mar. 2010, copyright 2010 ACM, p. 1-7.*
Japanese Office Action for 2013-140032 mailed on May 9, 2017.

*Primary Examiner* — Amelia Tapp
(74) *Attorney, Agent, or Firm* — IPUSA, PLLC

(57) ABSTRACT

A disclosed system includes an information accumulating apparatus; and an application, wherein the apparatus includes a storing part that stores at least one electronic data and electronic data information corresponding to the electronic data and including a data form and a convertible data form to which the data form can be converted, a request receiving part receiving an acquisition request from the application for acquiring the data form and the convertible data form, and a data sending part sending the electronic data information to the application upon receipt of the request, wherein the application includes a request sending part sending the acquisition request, a data receiving part receiving the electronic data information, a determining part determining a processable electronic data among the electronic data, and a display controlling part causing to display information related to the determined processable electronic data on the application side.

20 Claims, 19 Drawing Sheets

(51) Int. Cl.
*G06F 3/12* (2006.01)
*G06F 17/24* (2006.01)

(56) References Cited

U.S. PATENT DOCUMENTS

| | | | |
|---|---|---|---|
| 7,227,658 B2* | 6/2007 | Dorfman | G06Q 10/10 358/1.1 |
| 7,681,122 B1* | 3/2010 | Tsykora | G06F 17/30076 715/249 |
| 7,999,951 B2* | 8/2011 | Ferlitsch | G06F 3/1206 358/1.13 |
| 8,019,829 B2* | 9/2011 | Cocotis | H04L 29/06 358/1.15 |
| 8,275,862 B2 | 9/2012 | Yamamoto | |
| 8,395,801 B2* | 3/2013 | Ferlitsch | G06F 3/1206 358/1.15 |
| 8,976,379 B2* | 3/2015 | Lee | H04N 1/00347 358/1.13 |
| 2002/0035576 A1* | 3/2002 | Kishimoto | H04L 12/5835 |
| 2005/0235077 A1 | 10/2005 | Kubota | |
| 2008/0027953 A1 | 1/2008 | Morita et al. | |
| 2011/0149345 A1 | 6/2011 | Takata | |
| 2012/0038940 A1* | 2/2012 | Boskovic | G06F 3/1206 358/1.13 |
| 2012/0113461 A1 | 5/2012 | Tsuchida | |
| 2012/0144058 A1 | 6/2012 | Ohashi et al. | |
| 2013/0086467 A1* | 4/2013 | Weber | H04W 4/18 715/239 |

FOREIGN PATENT DOCUMENTS

| | | |
|---|---|---|
| JP | 2005-292903 | 10/2005 |
| JP | 2009-237724 | 10/2009 |
| JP | 2011-129054 | 6/2011 |
| JP | 2012-100218 | 5/2012 |
| JP | 2012-124604 | 6/2012 |

* cited by examiner

FIG.5

| ITEM | | |
|---|---|---|
| ORIGINAL DATA FORM | doc | pdf | jpg |
| CONVERTIBLE DATA FORM | pdf, ps, rpcs, jpg | ps, rpcs, jpg | pdf, rpcs |

FIG.6

| ITEM | EXAMPLE |
|---|---|
| FILE NAME | ABC CONFERENCE MINUTES.doc |
| FILE SIZE | 150kbyte |
| FOLDER IDENTIFYING INFORMATION | false |
| CONVERTIBLE DATA FORM | [pdf, ps, rpcs, jpg] |
| CONVERTED DATA FORM | [pdf] |
| FILE CREATED DATE | 2012/05/22 12:00 |
| FILE UPDATED DATE | 2012/05/23 17:00 |
| FILE FINALLY ACCESSED DATE | 2012/05/23 19:00 |

FIG.7

| # | PROTOCOL | METHOD | EXPLANATION | EXAMPLE |
|---|---|---|---|---|
| 1 | HTTP | GET | ACQUIRING FILE INFORMATION | http://\<IP ADDRESS\>/folder?folderPath=AllUsers/data/test<br>&startIndex=1<br>&count=10 |
| 2 | HTTP | GET | ACQUIRING THUMBNAIL IMAGE | http://\<IP ADDRESS\>/folder/thumbnail?filePath=AllUsers/data/test.doc |
| 3 | HTTP | GET | ACQUIRING pdf FILE | http://\<IP ADDRESS\>/folder/image?filePath=AllUsers/data/test.doc |
| 4 | HTTP | GET | ACQUIRING rpcs FILE | http://\<IP ADDRESS\>/folder/rpcs?<br>filePath=AllUsers/data/test.doc<br>&printCopies=1<br>&printDocumentSize=A4<br>&printPaperSize=A4<br>&printDocumentOrientation=Portrait<br>&printColorBw=Color<br>&printSort=Sort<br>&printDuplex=None<br>&printLayout=None |
| 5 | HTTP | GET | ACQUIRING IMAGE FILE | http://\<IP ADDRESS\>/folder/image?filePath=AllUsers/data/test.doc<br>&pageNumber=1 |

FIG.8A

| ITEM | EXAMPLE |
|---|---|
| FILE NAME | X PHOTO.tif |
| FILE SIZE | 500kbyte |
| FOLDER IDENTIFYING INFORMATION | false |
| CONVERTIBLE DATA FORM | [pdf, jpg] |
| CONVERTED DATA FORM | [pdf] |
| FILE CREATED DATE | 2012/04/11 14:00 |
| FILE UPDATED DATE | 2012/04/11 14:00 |
| FILE FINALLY ACCESSED DATE | 2012/05/01 08:00 |

FIG.8B

| ITEM | EXAMPLE |
|---|---|
| FILE NAME | CONFERENCE MATERIAL.ps |
| FILE SIZE | 1Mbyte |
| FOLDER IDENTIFYING INFORMATION | false |
| CONVERTIBLE DATA FORM | [rpcs] |
| CONVERTED DATA FORM | [rpcs] |
| FILE CREATED DATE | 2012/03/05 09:00 |
| FILE UPDATED DATE | 2012/03/11 16:00 |
| FILE FINALLY ACCESSED DATE | 2012/04/28 15:00 |

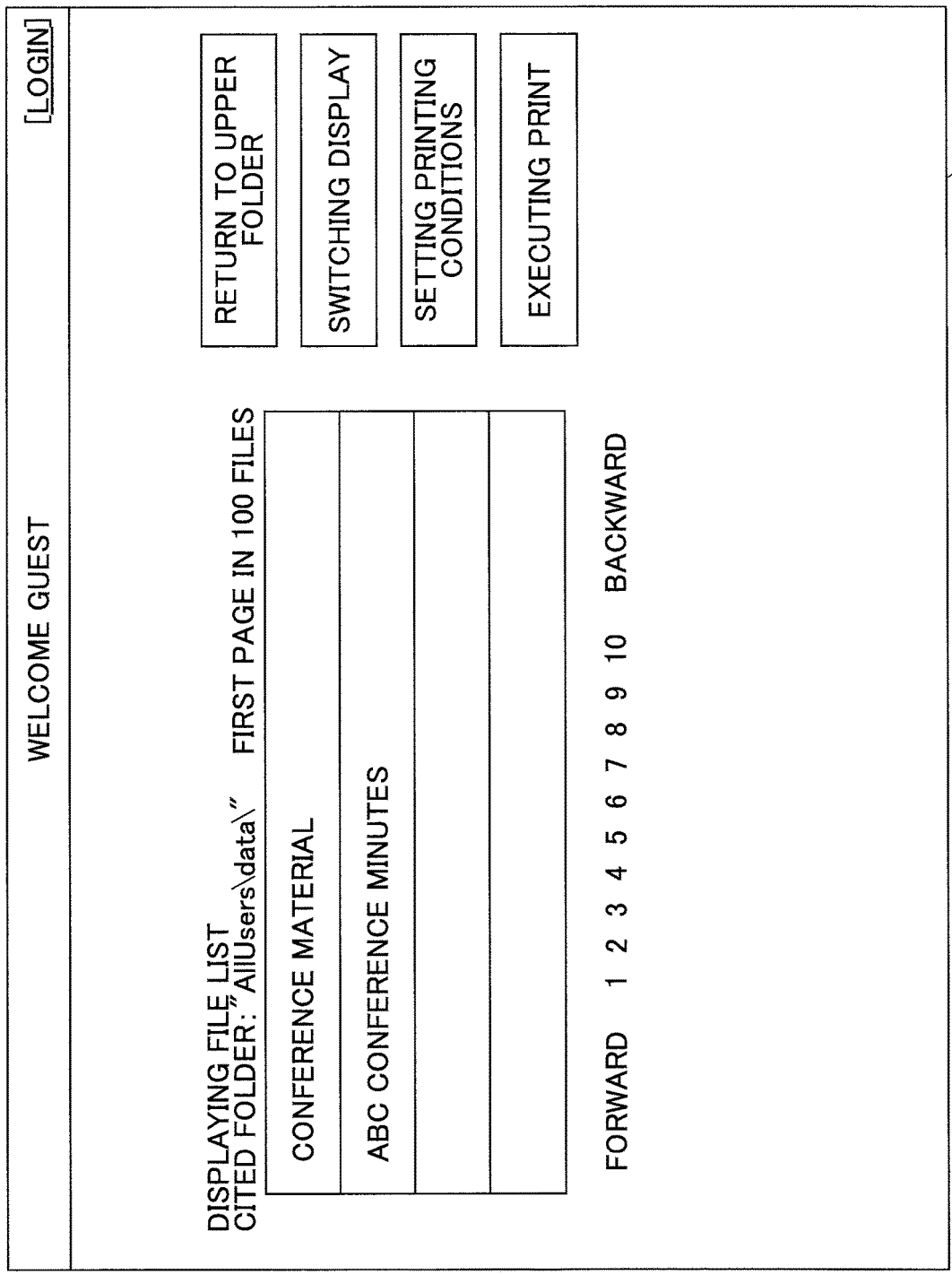

FIG.13

| ITEM | SETUP VALUE | EXPLANATION |
|---|---|---|
| HostAddress | 192.168.0.10 | IP ADDRESS OF MFP |
| Function | Scan,Print | FUNCTIONAL INFORMATION |

FIG.17

| ITEM | SETUP VALUE | EXPLANATION |
|---|---|---|
| HostAddress | 192.168.0.10 | IP ADDRESS OF PROJECTOR |
| name | PRJ1234 | PROJECTOR NAME |
| Function | Projection | FUNCTIONAL INFORMATION |
| ProjectionType | Protocol:OOOO | PROJECTOR TYPE |

FIG.19

| ITEM | | | |
|---|---|---|---|
| ORIGINAL DATA FORM | doc | pdf | jpg |
| AVAILABLE DATA FORM | doc, pdf, ps, rpcs, jpg | pdf, ps, rpcs, jpg | jpg, pdf, rpcs |

FIG.20

| ITEM | EXAMPLE |
|---|---|
| FILE NAME | ABC CONFERENCE MINUTES.doc |
| FILE SIZE | 150kbyte |
| FOLDER IDENTIFYING INFORMATION | false |
| AVAILABLE DATA FORM | [doc, pdf, ps, rpcs, jpg] |
| CONVERTED DATA FORM | [pdf] |
| FILE CREATED DATE | 2012/05/22 12:00 |
| FILE UPDATED DATE | 2012/05/23 17:00 |
| FILE FINALLY ACCESSED DATE | 2012/05/23 19:00 |

SYSTEM, INFORMATION PROCESSING APPARATUS, AND METHOD OF CONTROLLING DISPLAY

BACKGROUND OF THE INVENTION

1. Field of the Invention

The present invention relates to a system, an information processing apparatus, a method of controlling a display, and a program.

2. Description of the Related Art

An example of a control system allows devices, which can process mutually different data forms and are connected with a network, to collaborate. The control system includes a detecting means for detecting a service provided by a device connected with a network, a data inputting means for inputting data from a first device, which provides a service of inputting data and is detected by the detecting means, a converting means for converting the data form of the data input by the data inputting means to a data form that can be processed by a second device, which provides a service of outputting the data and is detected by the detecting means, and a service requesting means for requesting the second device for the service to the converted data converted by the converting means.

The above control system allows the first and second devices mutually processing data having different data forms to collaborate after converting the data form of data output by the first device to the data form which can be processed by the second device as in, for example, Patent Document 1.

In recent years, a user uses various devices (information processing apparatus) such as a printer, a multi function peripheral, a projector, mobile phone, a smartphone or a tablet PC, which is connected with a network. Therefore, there is a growing demand by the user for allowing a plurality of devices connected with the network to collaborate. In this mode (system) of using these devices, improvement in a utility value is expected by collaboration of various devices.

However, in the example of the control system described above, devices on the input side and the output side do not directly collaborate but the devices on the input side and the output side collaborate through another device such as a personal computer (PC). In this case, the user is required to be aware of the devices on the input and output sides in operating the other device such as the PC.

Therefore, operability is not good.

Patent Document 1: Japanese Laid-Open Patent Application No. 2005-292903

SUMMARY OF THE INVENTION

Accordingly, embodiments of the present invention provide a novel and useful system, an information processing apparatus, a method of controlling a display, and a program considering one or more of the points discussed above.

One aspect of the embodiments of the present invention may be to provide a system including an information accumulating apparatus; and an application installed in an information processing apparatus, wherein the information accumulating apparatus includes a storing part that stores at least one electronic data and electronic data information, each of which corresponds to each of the electronic data and includes a data form of the electronic data and a convertible data form to which the data form can be converted, a request receiving part that receives an acquisition request for acquiring the electronic data information corresponding to the electronic data from the application, and a data sending part that sends the electronic data information corresponding to the electronic data to the information processing apparatus upon receipt of the acquisition request received by the request receiving part, wherein the application includes a request sending part that sends the acquisition request to the information accumulating apparatus, a data receiving part that receives the electronic data information sent from the information accumulating apparatus, a determining part that determines a processable electronic data processable by the application among the electronic data, based on the data form and the convertible data form included in the electronic data information, and a display controlling part that causes a display part included in the information processing apparatus to display the electronic data information of the processable electronic data.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 is an exemplary structural view of a table including convertible data forms;

FIG. 6 is an exemplary structural view of file information;

FIG. 7 is an exemplary structural view of WebAPI serviced by the information accumulating apparatus;

FIG. 8A and FIG. 8B are other exemplary structural views of file information;

FIG. 9 illustrates an exemplary image of a file list screen displayed on a MFP;

FIG. 13 is an exemplary structural view of information read from the QR code;

FIG. 17 is an exemplary structural view of information read from a QR code;

FIG. 19 is an exemplary structural view of a table including available data forms; and FIG. 20 is another exemplary structural view of the file information.

DETAILED DESCRIPTION OF THE PREFERRED EMBODIMENTS

A description is given below, with reference to FIG. 1 through FIG. 20 of embodiments of the present invention. Where the same reference symbols are attached to the same parts, repeated description of the parts is omitted.

Reference symbols typically designate as follows:
1: collaborate processing system;
10: information accumulating apparatus;
11: smartphone;
12: tablet PC;
13: PC;
14: digital camera;
15: multi function peripheral (MFP);
16: network printer;
17: network projector;
100: computer system;
101: input device;
102: display device;
103: external I/F;
103a: recording medium;
104: RAM;
105: ROM;
106: CPU;
107: communication I/F;
108: HDD;
201: network connecting part;
202: file servicing part;
203: file storing region monitoring part;
204: job execution administrating part;
205: file administrating part;
206: file converting part;
207: file storing region;
208: converted file storing region;
B: bus; and
N1: network.

First Embodiment

<System Structure>

Figure 1:
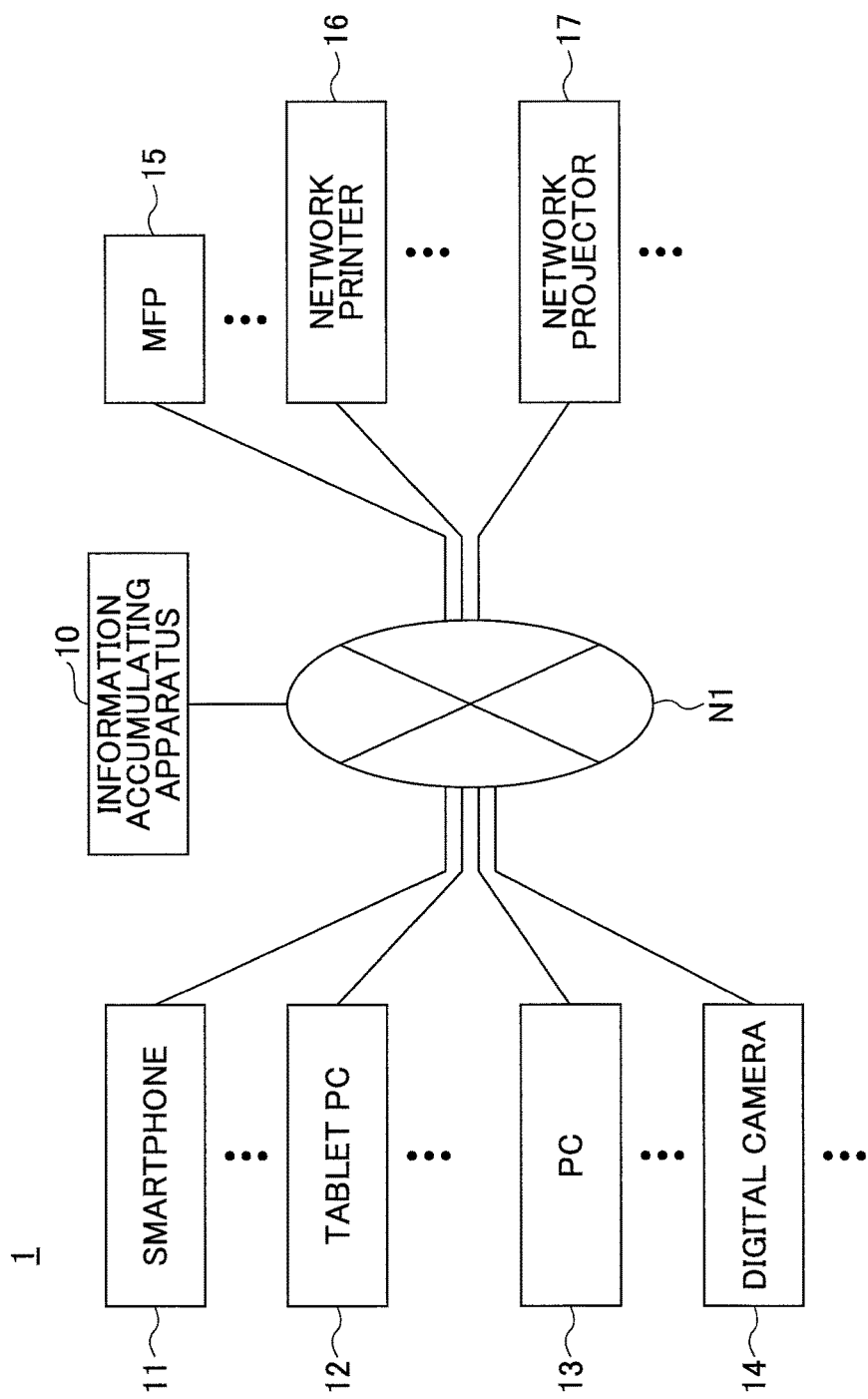
FIG. 1 illustrates an exemplary structure of a collaborate processing system of the embodiment.

FIG. 1 illustrates an exemplary structure of a collaborate processing system of the first embodiment. The collaborate processing system 1 includes an information accumulating apparatus 10, a smartphone 11, a tablet PC 12, a PC 13, a digital camera 14, a multi function peripheral (MFP) 15, a network printer 16, a network projector 17, and a network N1 connecting these. The total number of the smartphone 11, the tablet PC 12, the PC 13, the digital camera 14, the multi function peripheral (MFP) 15, the network printer 16, and the network projector 17 may be one or greater.

The smartphone 11, the tablet PC 12, the PC 13, the digital camera 14, the multi function peripheral (MFP) 15, the network printer 16, and the network projector 17 are examples of a device (an information processing apparatus). The network N1 uses a wired local area network (LAN), a wireless LAN, or the like. Through the network N1, communications among different devices are possible.

The smartphone 11 and the tablet PC 12 are examples of devices carried (taken along) by a user and operated. The device may be an information processing apparatus operated by the user. The device is, for example, a mobile phone. The smartphone 11 and the tablet PC 12 have, for example, a wireless communication function, functions of displaying and storing various files, and functions of sending and receiving various files.

The PC 13 is, for example, a desktop PC and/or a portable PC. The PC 13 uses a server message block (SMB) protocol of the network N1 to perform various file operations such as newly creating, updating, deleting, and/or renaming the file with respect to folders in the information accumulating apparatus 10. The folder may be referred to as a directory and is an example of a location where data and files are stored.

The digital camera 14 has, for example, a wireless communication function, with which an imaged image file can be stored in a folder of the information accumulating apparatus 10. Further, the digital camera 14 can display an image file stored in a folder of the information accumulating apparatus 10.

The MFP 15 is an example of the image forming apparatus. The MFP 15 is an image processing apparatus having multiple functions of copying, facsimiling (FAX), printing, scanning, and/or delivering an input image. The input image is, for example, an image of an original image read by a scanner function, an image input by a print function, or an image input by a facsimile function. The MFP 15 can print a file stored in the information accumulation apparatus 10. An original image read by the scanner function can be stored in the information accumulating apparatus 10.

The network printer 16 is an example of the image forming apparatus having the print function. The network printer 16 has a function of printing a file stored in the information accumulating apparatus 10 through the network N1.

The network projector 17 is an example of an image projecting apparatus having a projection function. The network projector 17 can access the information accumulating apparatus 10 through the network N1. The network printer 16 has a function of projecting the file stored in the information accumulating apparatus 10 or the like.

The devices are not limited to the smartphone 11, the tablet PC 12, the PC 13, the digital camera 14, the MFP 15, the network printer 16, and the network projector 17. A device (for example, a television set) connectable with the network N1 can be the device of the first embodiment.

The information accumulating apparatus 10 is an example of a collaborate processing apparatus. The information accumulating apparatus 10 has a function as a file server which can acquire and store a file from or to another device such as the smartphone 11 and the MFP 15. The information accumulating apparatus 10 has a function of converting a file (data) form or the like. Further, the information accumulating apparatus 10 can be connected with various devices through the network N1. The information accumulating apparatus 10 can be distributed to a plurality of computers.

<Hardware Structure>

Figure 2:
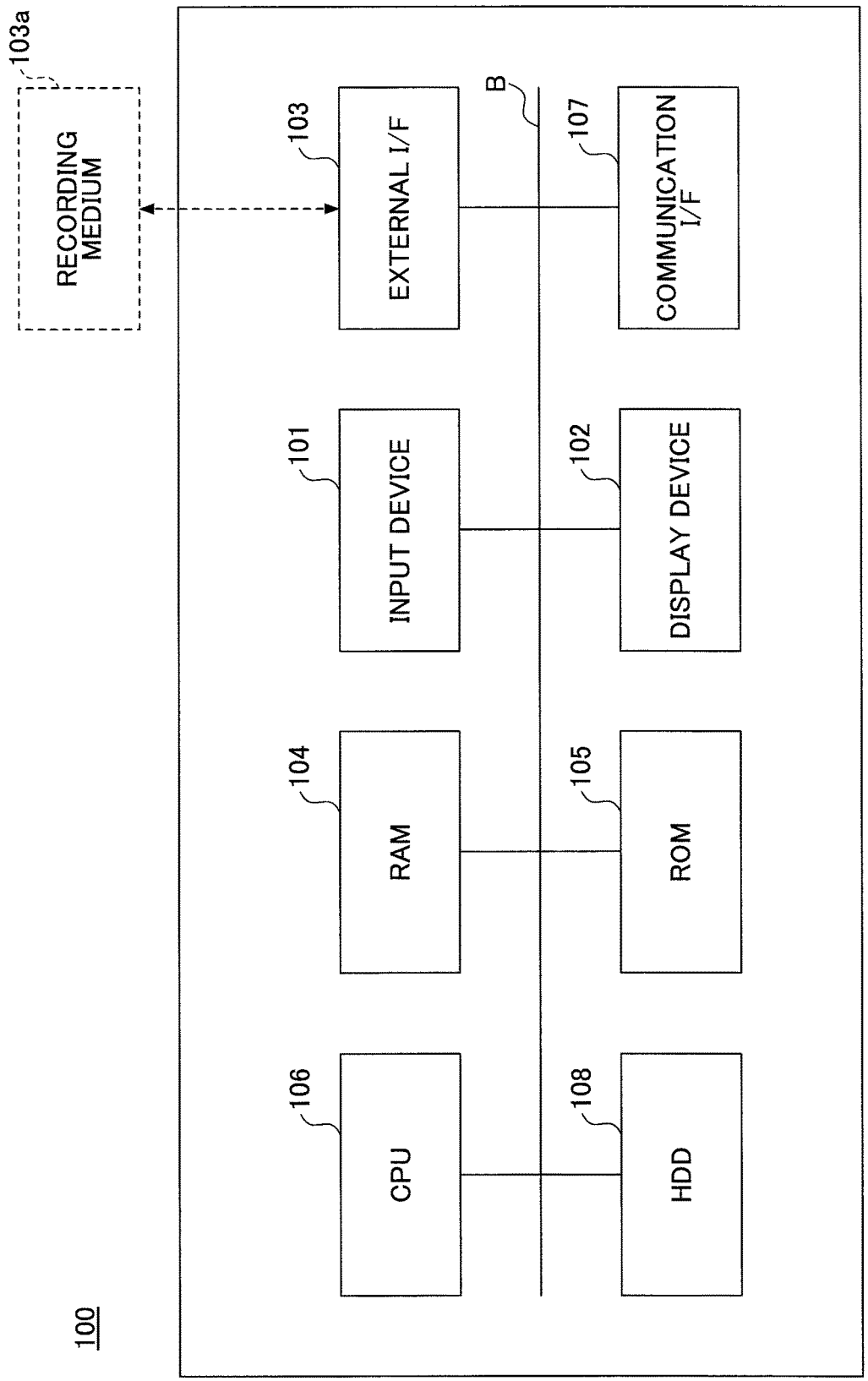
FIG. 2 illustrates an exemplary hardware structure of a computer system of the embodiment.

For example, the information accumulating apparatus 10 is realized by a hardware structure illustrated in, for example, FIG. 2. The device such as the smartphone 11, the tablet PC 12, or the PC 13 has a hardware structure illustrated in FIG. 2. FIG. 2 illustrates an exemplary hardware structure of a computer system of the first embodiment.

Referring to FIG. 2, the computer system 100 includes an input device 101, a display device 102, an external I/F 103, a RAM 104, a ROM 105, a CPU 106, a communication I/F 107, a HDD 108, and so on. In the computer system 100, the input device 101, the display device 102, the external I/F 103, the RAM 104, the ROM 105, the CPU 106, the communication I/F 107, and the HDD 108 are mutually connected by a bus B. The input device 101 may include a keyboard and a mouse, which are used to input various operation signals to the computer 100.

The output device 102 includes a display or the like to display a processing result obtained by the computer system 100. The communication I/F 107 is an interface provided to connect the computer system 100 with the network N1. Thus, the computer system 100 can perform data communications with another device and/or another apparatus through the communication I/F 107.

The HDD 108 is a non-volatile memory device storing various programs and data. The stored program and data are an operating system (OS), which is basic software controlling the entire computer system 100, application software providing various functions in the OS, and so on. The HDD 108 administrates the stored program and data with a predetermined file system and/or a database (DB).

The external I/F 103 is an interface with an external apparatus. The external device is a recording medium 103a or the like. With this, the computer system 100 can read information from the recording medium 103a and/or write information to the recording medium 103a through the external I/F 103. The recording medium 103a includes a flexible disk, a CD, a digital versatile disk (DVD), an SD Memory card, a universal serial bus (USB) memory, or the like.

The ROM 105 is a non-volatile semiconductor memory (memory device) which can hold a program and/or data even when the ROM 105 is powered off. The ROM 105 stores programs and data such as basic input/output system (BIOS), OS setup, network setup, or the like, which are executed at a time of booting up the computer system 100. The RAM 104 is a volatile semiconductor memory (memory device) temporally storing programs and/or data.

The CPU 106 reads the program and/or data from the memory device such as the ROM 105, the HDD 108, or the like. The read program or data undergo processing to thereby realize an entire control or functions of the computer system 100.

The information processing apparatus 100 can substantialize various processes described below with the above hardware structure.

<Software Structure>

Figure 3:
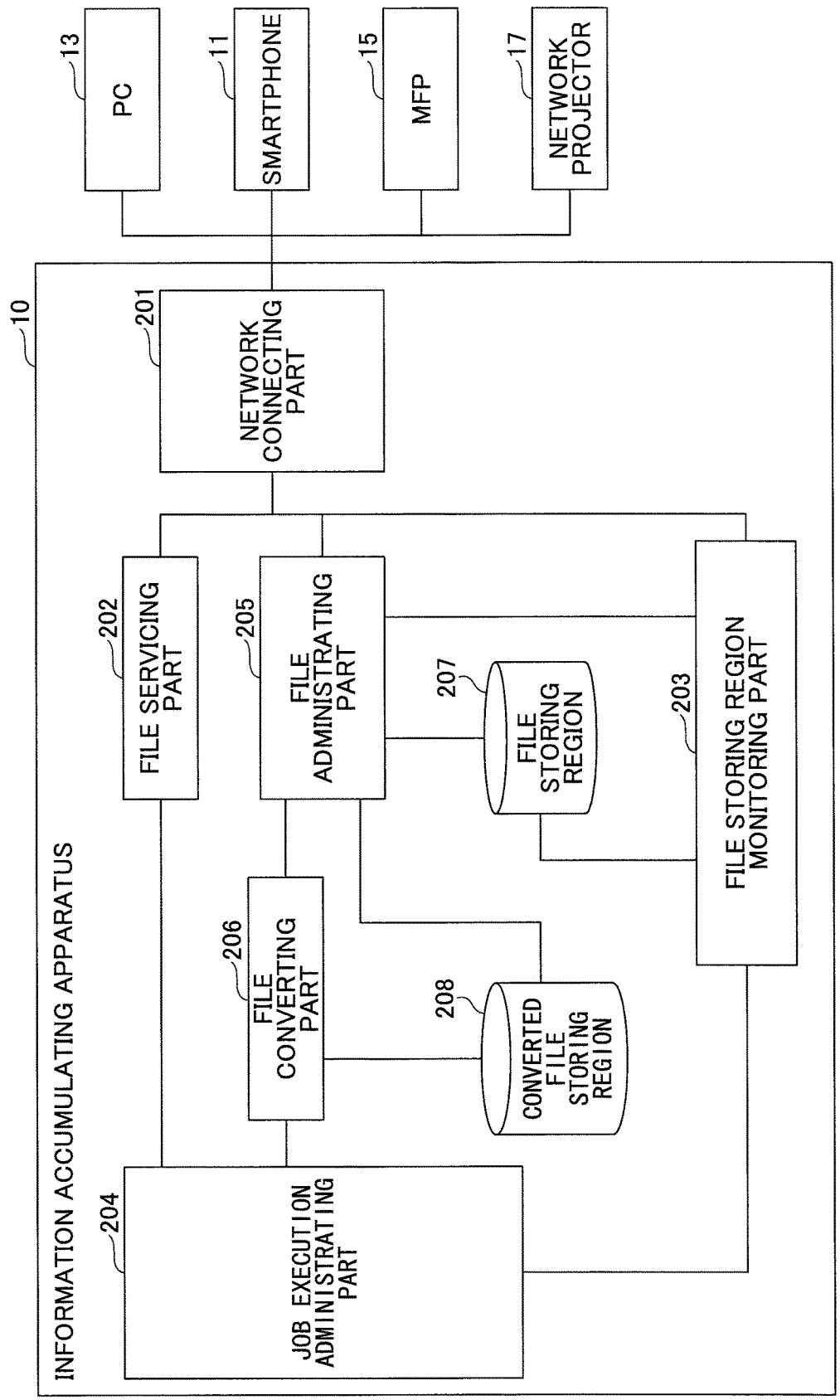
FIG. 3 is an exemplary processing block chart of an information accumulating apparatus of the embodiment.

The information accumulating apparatus 10 of the first embodiment is substantialized by the processing block illustrated in, for example, FIG. 3. FIG. 3 is an exemplary processing block chart of the information accumulating apparatus of the first embodiment. The information accumulating apparatus 10 substantializes a network connecting part 201, a file servicing part 202, a file storing region monitoring part 203, a job execution administrating part 204, a file administrating part 205, a file converting part 206, a file storing region 207, and a converted file storing region 208.

Referring to FIG. 1, the information accumulating apparatus 10 can be connected with the device such as the smartphone 11, the tablet PC 12, the PC 13, the digital camera 14, the MFP 15, the network printer 16, the network projector 17 and so on through the network N1. Referring to FIG. 3, the smartphone 11, the PC 13, the MFP 15, and the network projector 17 are illustrated as the device.

The network connecting part 201 provides Web application programming interface (API) to the devices such as the smartphone 11, the PC 13, the MFP 15, and the network projector 17 and communicates with the devices.

The file storing region monitoring part 203 monitors various file operations such as new creation, update, deletion, and so on for files stored in the file storing region 207. The converted file storing region 208 stores files having data forms suitable for the devices. The file servicing part 202 provides files stored in the converted file storing region 208.

Further, the file servicing part 202 requests the job execution administrating part 204 to convert files so that the files have data forms used by the devices. The job execution administrating part 204 requests the file converting part 206 to convert the data forms of the files. The file converting part 206 converts the data forms of the files. The file converting part 206 stores the converted file whose data form is converted in the converted file storing region 208.

The file administrating part 205 administrates corresponding information of the files in order to associate unconverted files stored in the file storing region 207 with the converted files stored in the converted file storing region 208.

When the network connecting part 201 receives a file information acquisition request using WebAPI from the devices, the network connecting part 201 inquires at the file administrating part 205. The network connecting part 205 acquires the file information and sends the file information to the devices.

When the network connecting part 201 receives a file acquisition request using WebAPI from the devices, the network connecting part 201 inquires at the file administrating part 205. The network connecting part 205 acquires the converted file and sends the converted file to the devices. When the file corresponding to the file acquisition request received from the device is an unconverted file stored in the file storing region 207, the network connecting part 201 sends the unconverted file to the device.

The network connecting part 201 receives a HTTP request from the device using WebAPI and performs a HTTP response. The WebAPI is an interface previously defined in order to receive requests from the devices and is formed by, for example, functions, classes, or the like.

Further, the WebAPI of the information accumulating apparatus 10 can be provided as a software development kit (SDK) to developers of applications. The developers of the applications can develop the applications using the SDK. The SDK can be serviced to a third vendor other than a person who servicing the information accumulating apparatus 10. The third vendor can develop the applications using the serviced SDK. The applications developed using the SDK can be installed in the devices.

By servicing the WebAPI of the information accumulating apparatus 10 as the SDK, not only applications developed by a person who services the information accumulating apparatus 10 but also applications developed by the third vendor can be installed in the information accumulating apparatus 10.

The network connecting part 201 releases the file storing region 207 to the public on the network N1 using, for example, a SMB protocol. The users can access the file storing region 207 released on the network N1 using the devices.

Files stored by the file storing region 207 and the converted file storing region 208 are an image file, an application file, a document file, and so on. The files belong to data as one mode of the data.

The information accumulating apparatus 10 uses the WebAPI and the SMB protocol as an interface for the file storing region 207. The processes of the first embodiment are for using the WebAPI as the interface for the file storing region 207.

<Detailed Process>

Hereinafter, a detailed process of the collaborate processing system 1 of the first embodiment is described.

Figure 4:
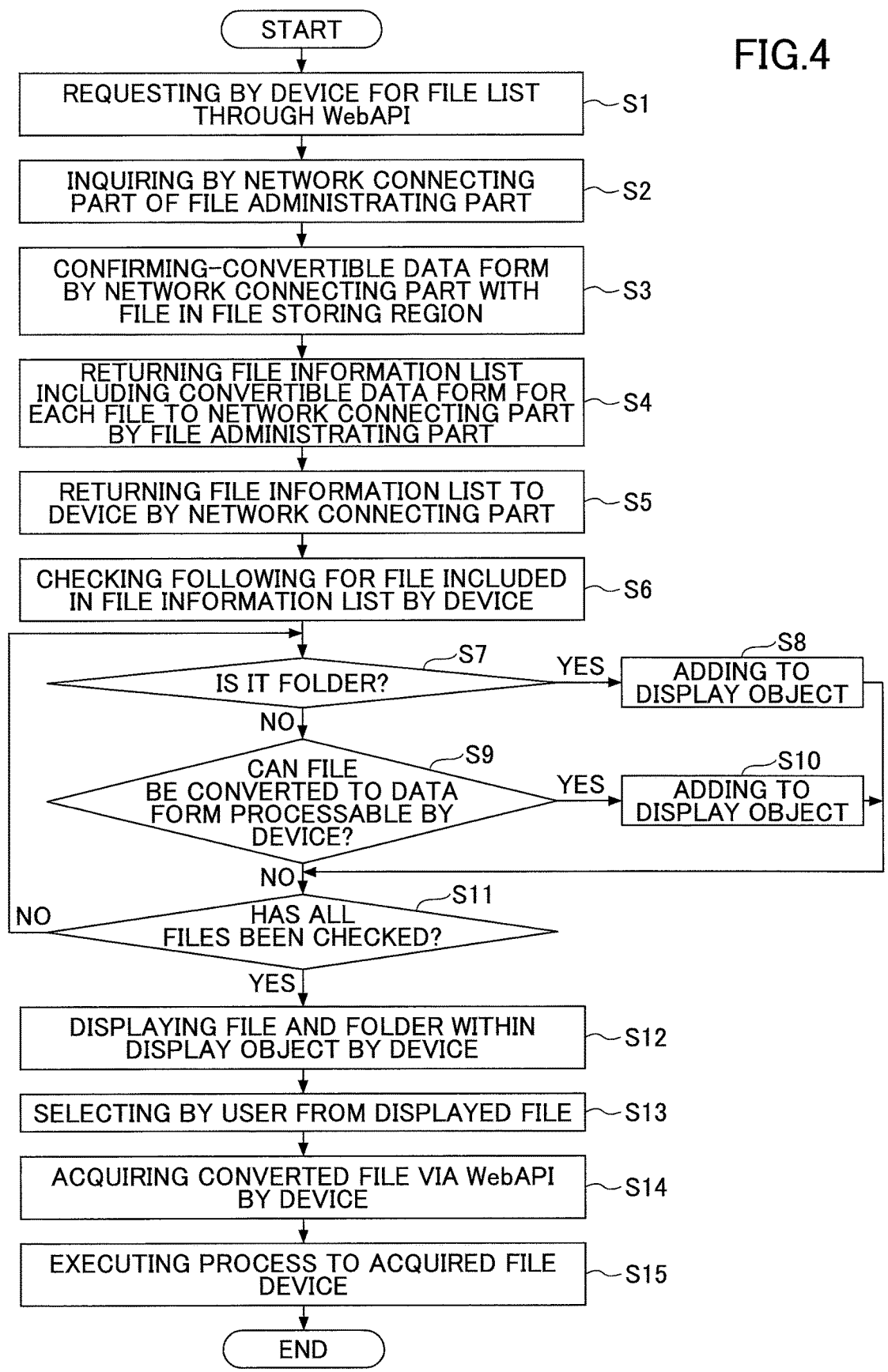
FIG. 4 illustrates an exemplary flowchart illustrating processing steps in a collaborate processing system of the embodiment.

FIG. 4 illustrates an exemplary flowchart illustrating processing steps in the collaborate processing system of the first embodiment. The user accesses the file stored in a shared folder (the file storing region 207) of the information accumulating apparatus 10 from the device. Hereinafter, explanation is given on the premise that a file having a form of ".doc", which is created by word-processing software as an example of the application software, is stored in the shared folder of the information accumulating apparatus 10. The word-processing software may be Microsoft Word ("Microsoft Word" is a registered trademark).

In step S1, the device sends a file information acquisition request to request the information accumulating apparatus 10 to provide a file stored in the shared folder through the WebAPI. The network connecting part of the information accumulating apparatus 10 receives the file information acquisition request through the WebAPI.

In step S2, the network connecting part 201 sends a file information acquisition request to request the file administrating part 205 to provide file information of the file stored in the shared folder. In step S3, the file administrating part 205 refers to a table indicative of convertible data forms for the files stored in the shared folder as illustrated in FIG. 5. The file administrating part 205 checks whether the files stored in the shared folder have the convertible data forms.

FIG. 5 is an exemplary structural view of a table including the convertible data forms. The table illustrated in FIG. 5 associates original data forms with convertible data forms which can be converted from the original data forms. For example, referring to FIG. 5, the file whose original data form is "doc" is associated with the convertible data forms of "pdf, ps, rpcs, jpg". Therefore, when the file administrating part 205 refers to the table illustrated in FIG. 5, the file administrating part 205 can check the convertible data forms of "pdf, ps, rpcs, jpg", which can be converted from the file having the data form of "doc".

After the file administrating part 205 checks the convertible data forms for the files stored in the shared folder, the file administrating part 205 creates the file information for files and folders stored in the shared folder as illustrated in FIG. 6.

FIG. 6 is an exemplary structural view of the file information. Referring to FIG. 6, the file information includes items of "file name", "file size", "folder identifying information", "convertible data form", "converted data form", "file created date", "file updated date", and "file finally accessed date". The item of "convertible data form" contained in the file information is checked using the table illustrated on FIG. 5. If the item of "folder identifying information" is "true" indicative of the folder, folder information is displayed instead of the file information.

By creating the file information illustrated in FIG. 6 for each of the files and the folders stored in the shared folder, the file administrating part 206 file information list. The file information list includes file information for each of the files and the folders stored in the shared folder.

In step S4, the file administrating part 205 sends the file information list created in step S3 to the network connecting part 201. In step S5, the network connecting part 201 sends the file information lists to the device as responses to the file information acquisition requests received from the devices, respectively.

In step S6, the application installed in the device performs the processes in steps S7 to S11 for each file information list received from the information accumulating apparatus. The processes in steps S7 to S11 are performed for each items of the file information illustrated in FIG. 6 of the files and the folders stored in the shared folder.

In step S7, the application refers to the item of "folder identifying information" for each file information included in the file information list and determines whether the file information is the folder information. If the file information is the folder information, the application proceeds to step S8 and adds the file information to a display object. Meanwhile, the file information is not the folder information, the application determines whether the file indicated by the file information can be converted to a data form processable by the device in step S9. The data form processable by the device depends on the application installed in the device. The expression of "processable" relates to, for example, printing, displaying, projecting, editing or the like.

In step S9, if the data form processable by the device matches the convertible data form contained in the file information, the application determines that the file indicated by the file information can be converted to the processable data form.

If the file can be converted to the processable data form processable by the device, the application proceeds to step S10 and adds the file information to the display object. On the other hand, if the file cannot be converted to the processable data form processable by the device, the application proceeds to step S11 and determines whether all pieces of the file information have been checked.

If all pieces of the file information have not been checked, the application returns to step S7 and continues processing for pieces of the file information which have not been checked yet. If the all pieces of the file information have been checked, the application continues the processes on or after step S12.

By the processes of steps S6 to S11, the application checks the file information list received from the information accumulating apparatus 10 and selects pieces of the file information of the convertible file, which can be converted to the data form processable by the own device and the file information of the folder.

In step S12, the application can display the convertible file which can be converted to the processable data form which can be processed by the device and the folder based on the file information of the file and the file information of the folder added to the display object in steps S8 and S10.

In step S13, the user selects one file out of the displayed file list. In step S14, the device sends a file acquisition request for the file selected by the user through the WebAPI prepared to acquire the file having the data form processable by the device to the information accumulating apparatus. The network connecting part 201 of the information accumulating apparatus 10 receives the file acquisition request through the WebAPI.

The file converting part 206 reads the file selected by the user from the file storing region 207, converts to the file having the data form processable by the device, and stores in the converted file storing region 208. Then, the file servicing part 202 sends the converted file stored in the converted file storing region 208 to the network connecting part 201.

The network connecting part 201 sends the file acquisition request received from the device to the device as a response to the file acquisition request received from the device. In step S15, the application installed in the device performs the processes such as printing, displaying, projecting, or editing for the converted file received from the information accumulating apparatus 10.

FIG. 7 is an exemplary structural view of WebAPI serviced by the information accumulating apparatus. Referring to FIG. 7, a thumbnail image acquisition request, a pdf file acquisition request, a rpcs file acquisition request, and an image file acquisition request are examples of WebAPI prepared for acquiring a file of the data form processable by the device.

Further, the process in step S9 described with reference to the file information illustrated in FIG. 8. FIG. 8A and FIG. 8B are other exemplary structural views of file information. FIG. 8A illustrates file information whose convertible data form is pdf and jpg. FIG. 8B illustrates file information whose convertible data form is rpcs.

For example, in a case where the device is the MFP 15 and the data form processable by the MFP 15 is rpcs, the convertible data form of the file information in FIG. 8A is pdf and jpg. Therefore, the processable data form processable by the MFP 15 is not satisfied (does not match pdf and jpg). Then, the file is not determined to be the convertible file which can be converted to the data form processable by the MFP 15.

Then, the application does not add the file information of FIG. 8A in the display object. Resultantly, the file indicated by FIG. 8 is not displayed on the MFP 15.

For example, in a case where the device is the MFP 15 and the data form processable by the MFP 15 is rpcs, the convertible data form of the file information in FIG. 8B is rpcs. Therefore, the processable data form processable by the MFP 15 is satisfied (does match rpcs). Then, the file is determined to be the convertible file which can be converted to the data form processable by the MFP 15.

Then, the application adds the file information of FIG. 8A to the display object. Resultantly, the file indicated by the file information illustrated in FIG. 8B is displayed on the MFP 15.

For example, in a case where the device is the smartphone 11 and the data form processable by the smartphone 11 is pdf and jpg, the convertible data form of the file information in FIG. 8A is pdf and jpg. Therefore, the processable data form processable by the smartphone 11 is satisfied (does match pdf and jpg). Then, the file is determined to be the convertible file which can be converted to the data form processable by the smartphone 11.

Then, the application adds the file information of FIG. 8A to the display object in step S10. Resultantly, the file indicated by FIG. 8A is displayed on the smartphone 11.

For example, in a case where the device is the smartphone 11 and the data form processable by the smartphone 11 is pdf and jpg, the convertible data form of the file information in FIG. 8B is rpcs. Therefore, the processable data form of pdf and jpg processable by the smartphone 11 is not satisfied (does not match rpcs). Then, the file is not determined to be the convertible file which can be converted to the data form processable by the smartphone 11.

Then, the application does not add the file information of FIG. 8B to the display object in step S10. Resultantly, the file indicated by the file information illustrated in FIG. 8B is not displayed on the smartphone 11.

When the file information illustrated in FIGS. 6, 8A and 8B is included in the file information list, the MFP 15 displays a file list screen 1000 illustrated in, for example, FIG. 9. In the file list screen 1000 illustrated in FIG. 9, the file name "ABC conference minutes" of the file information illustrated in FIG. 6 and the file name "conference material" of the file information illustrated in FIG. 8B are displayed. However, the file name "X photo" of the file information illustrated in FIG. 8A is not displayed.

Figure 10:
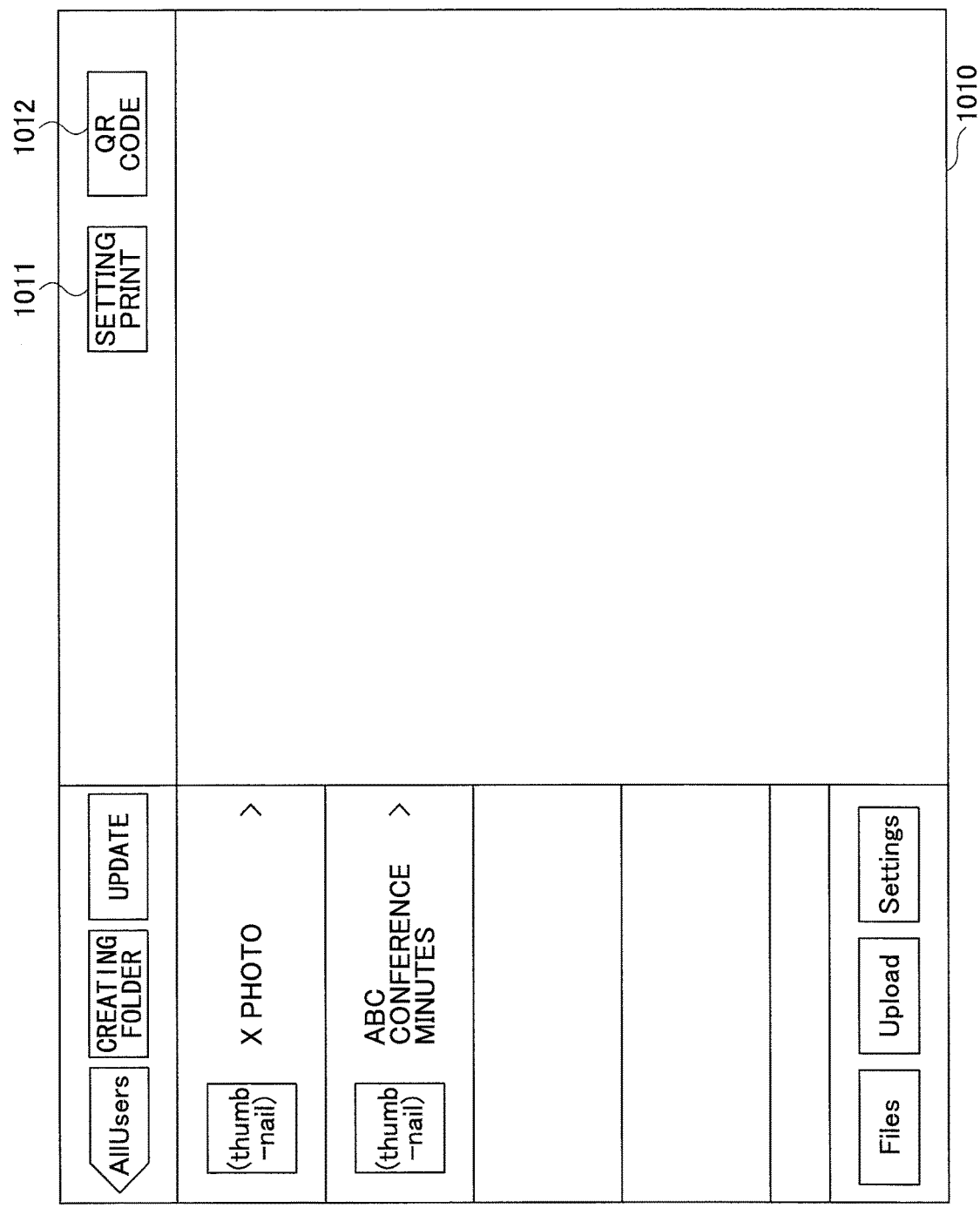
FIG. 10 illustrates an exemplary image of a file list screen displayed on a smartphone.

For example, in a case where the file information list includes the file information illustrated in FIGS. 6, 8A and 8B, the smartphone 11 displays a file list screen 1010 illustrated in FIG. 10. In the file list screen 1010 illustrated in FIG. 10, the file name "ABC conference minutes" of the file information illustrated in FIG. 6 and the file name "X photo" of the file information illustrated in FIG. 8A are displayed. However, the file name "conference material" of the file information illustrated in FIG. 8B is not displayed.

As described, the devices such as the smartphone 11 and the MFP 15 display the convertible files convertible to the data form processable by the device on their file list screens and the files which cannot be converted to the data form which cannot be processed by the device are not displayed on the file list screen. Therefore, operability of the device can be improved.

Figure 11:
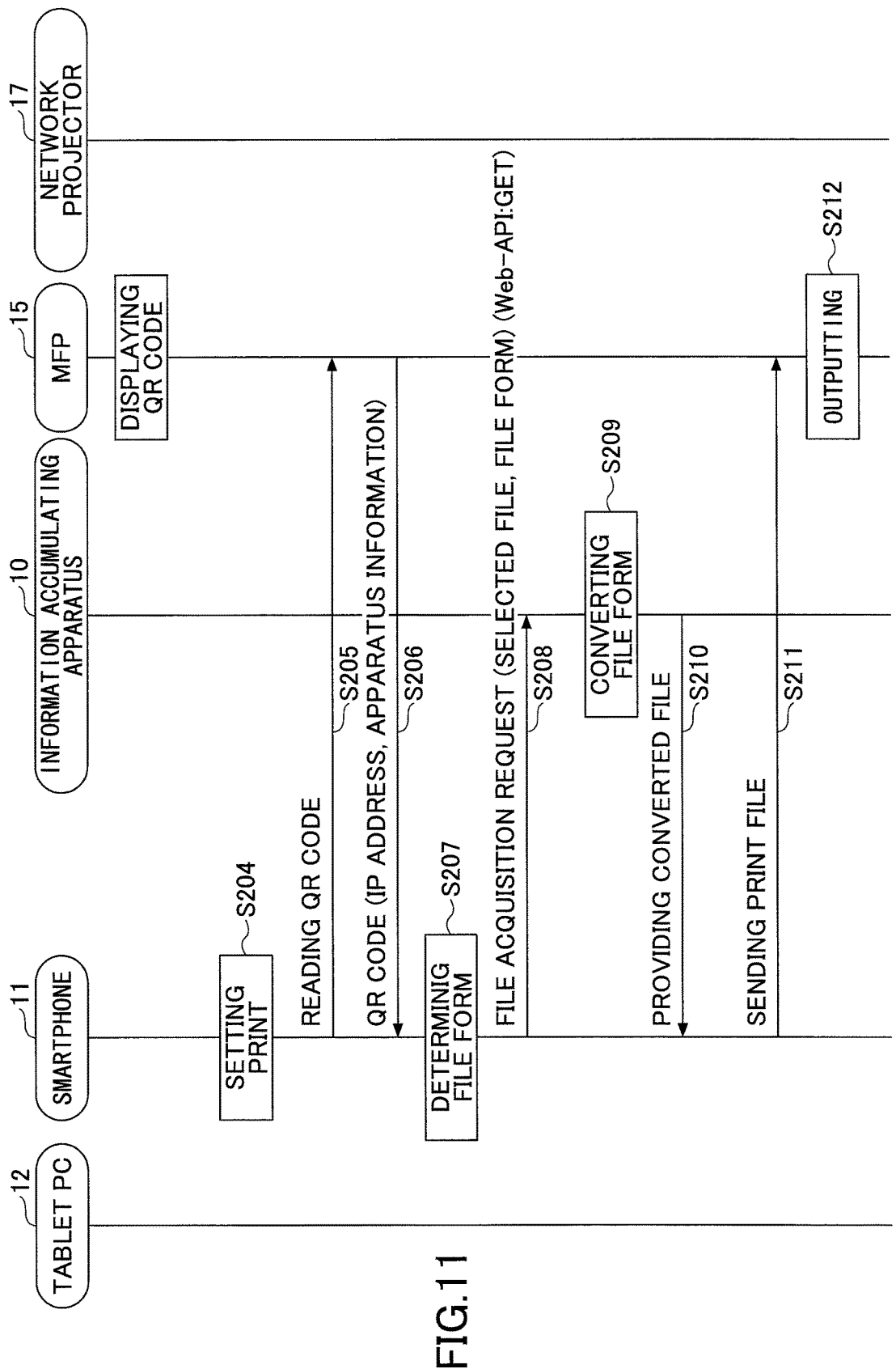
FIG. 11 is an exemplary sequence diagram illustrating printing processes in a collaborate processing system of the embodiment.

As an example of a process performed in step S15 illustrated in FIG. 4, printing processes are described. FIG. 11 is an exemplary sequence diagram illustrating printing processes in a collaborate processing system of the first embodiment.

When a button 1011 of "setting print" is selected on the file list screen 1010 (see FIG. 10), the smartphone 11 displays a print setup screen in step S204. The user operates the smartphone 11 to set up printing performed by the MFP 15 through the print setup screen.

Figure 12:
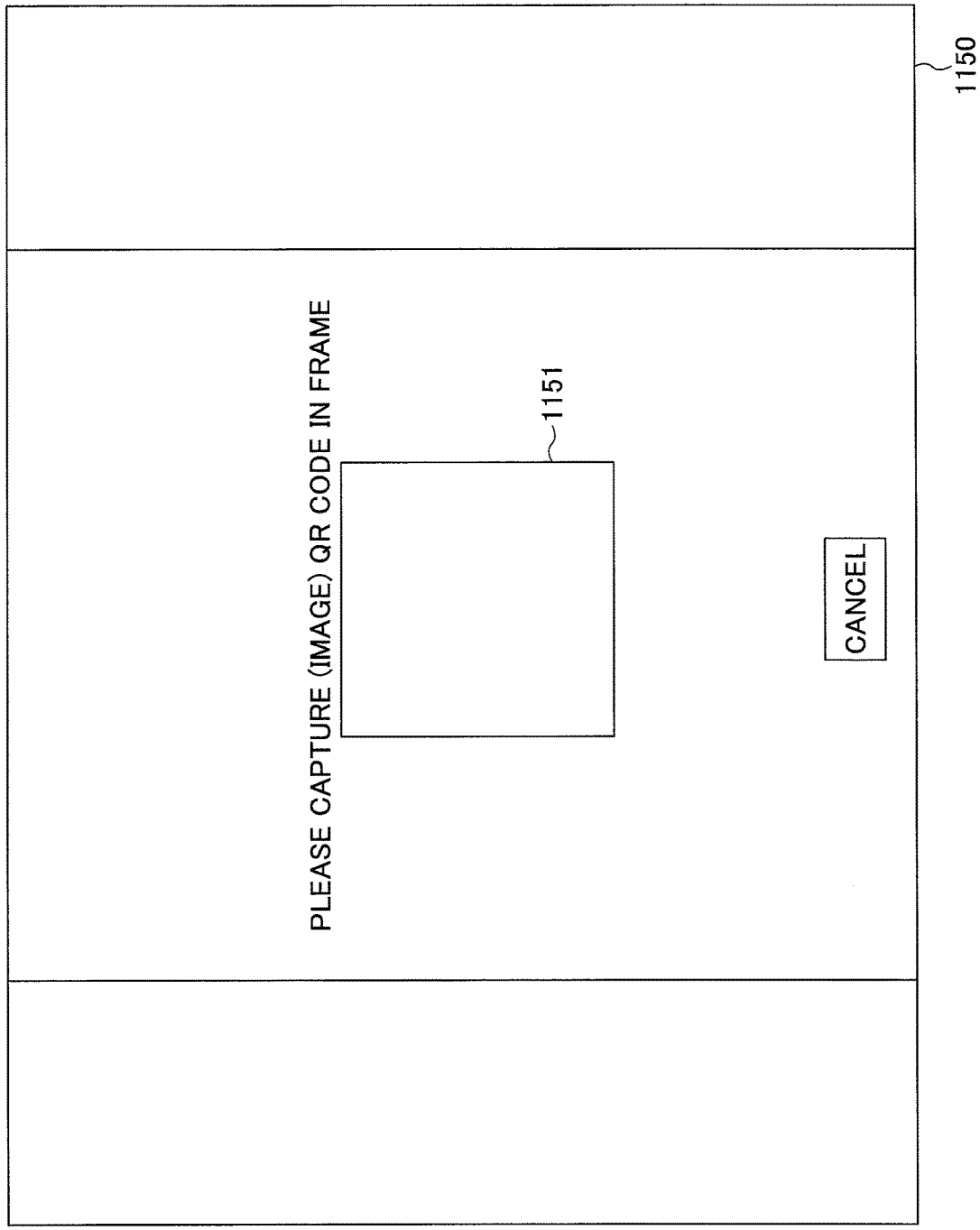
FIG. 12 illustrates an exemplary image of a QR code reading screen.

For example, a file "ABC conference minutes" is selected by the user to make the MFP 15 print from the files displayed on the file list screen illustrated in FIG. 10. Then, the user selects a "QR" button 1012 to cause the smartphone 150 to display a QR code reading screen 1150 illustrated in, for example, FIG. 12. FIG. 12 illustrates an exemplary image of the QR code reading screen. In the QR code reading screen 1150, a QR code displaying area 1151 is included. The QR code displaying area 1151 is an area where an image imaged by a camera function is displayed.

In steps S205 and S206, the user operates the smartphone 11 to adjust a positional relationship between the QR code displayed on the MFP 15 and the smartphone 11 so that the QR code imaged by a camera function is displayed in the QR code displaying area 1151 of the QR code reading screen 1150.

The application of the smartphone 11 reads the IP address of the MFP 15 and functional information indicative of a scan function and a print function in the MFP 15 from the QR code imaged by the camera function of the smartphone 11. FIG. 13 is an exemplary structural view of information read from a QR code.

The method of acquiring the IP address and the functional information is not limited to the acquisition by imaging the QR code but also a communication means between the smartphone 11 and the MFP 15 such as infrared communication, Bluetooth, NFC, or the like.

The application of the smartphone 11 displays a screen indicative of, for example, a download after reading the IP address of the MFP 15 and the functional information indicative of the scan function and/or the print function from the QR code.

The timing when the QR code is displayed on the MFP 15 and the timing when the QR code is read from the MFP 15 are not limited to the order illustrated in the sequence diagram of FIG. 11.

In step S207, the application of the smartphone 11 determines a file type as follows depending on the functional information read from the QR code. For example, when the functional information includes print function, the application of the smartphone determines that the file form is RPCS, PDL, or the like, which can be printed by the MFP 15.

In step S208, the application of the smartphone 11 sends a file acquisition request to the information accumulating apparatus 10. The file acquisition request includes information of a selected file and the information of the file form determined in step S207.

In step S209, the information accumulating apparatus 10 receives the file acquisition request and reads the file based on the information of the selected file included in the file acquisition request. The information accumulating apparatus 10 determines whether it is necessary to change the file form of the file read out based on "the information of the file form" included in the file acquisition request. For example, if the file form indicated in the file acquisition request is the same as the file form of the read file, the information accumulating apparatus 10 determines that the conversion of the file form is unnecessary. If the file form indicated in the file acquisition request is different from the file form of the read file, the information accumulating apparatus 10 determines that the conversion of the file form is necessary. If it is determined that it is necessary to convert the file form, the information accumulating apparatus converts the file form. Explanation if given on an example where it is determined that the file conversion is necessary.

The information accumulating apparatus 10 provides the converted file to the smartphone 11 by an HTTP response in step S210. In step S211, the application of the smartphone 11 sends the converted file as a print file to the MFP 15.

The method of sending the print file to the MFP 15 includes a method of sending the print file to a port No. 9100 of the MFP 15 using, for example, socket communication. In step S212, when the MFP 15 receives the print file, the print file is printed (outputted).

Figure 14:
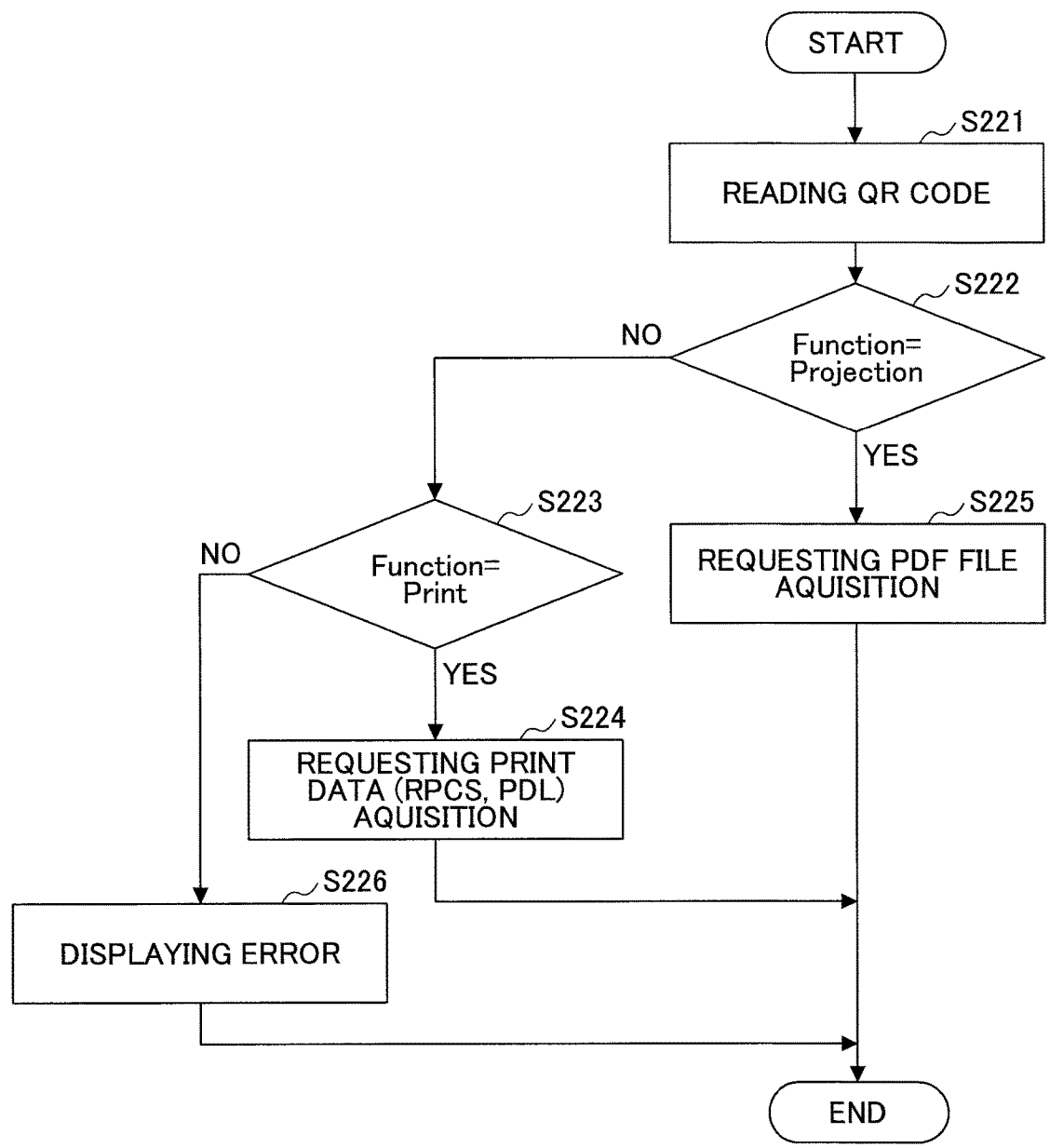
FIG. 14 is an exemplary flowchart illustrating processing steps in a smartphone.

FIG. 14 is an exemplary flowchart illustrating processing steps in the smartphone. Referring to the flowchart illustrated in FIG. 14, processes after the QR code reading screen 1150 is displayed on the smartphone 11 are illustrated.

In step S221, the application of the smartphone 11 reads a setup value of an item "Function" illustrated in FIG. 13 from the QR code imaged by the camera function.

In step S222, the application of the smartphone 11 determines whether the setup value of the item "Function" is "Projection" indicative of the projection function (the network projector 17). If the setup value of the item "Function" is "Projection" indicative of the projection function, the process goes to step S225. The application of the smartphone 11 requests a file acquisition designating a file form of PDF, which can be projected by the network projector 17 to the information accumulating apparatus 10.

If the setup value of the item "Function" is not "Projection" indicative of the projection function, the process goes to step S223. The application of the smartphone 11 determines whether the setup value of the item "Function" is "Print" indicative of the print function (MFP15). If the setup value of the item "Function" is "Print" indicative of the print function, the process goes to step S224. The application of the smartphone 11 requests a file acquisition designating a file form of RPCS and PDL as a file form, which can be printed by the MFP 15 to the information accumulating apparatus 10. In step S223, if the setup value of the item "Function" is not "Print" indicative of the print function, the application of the smartphone 11 cannot determine the file form to be designated in the file acquisition request. Therefore, the process goes to step S226 and an error is displayed.

Figure 15:
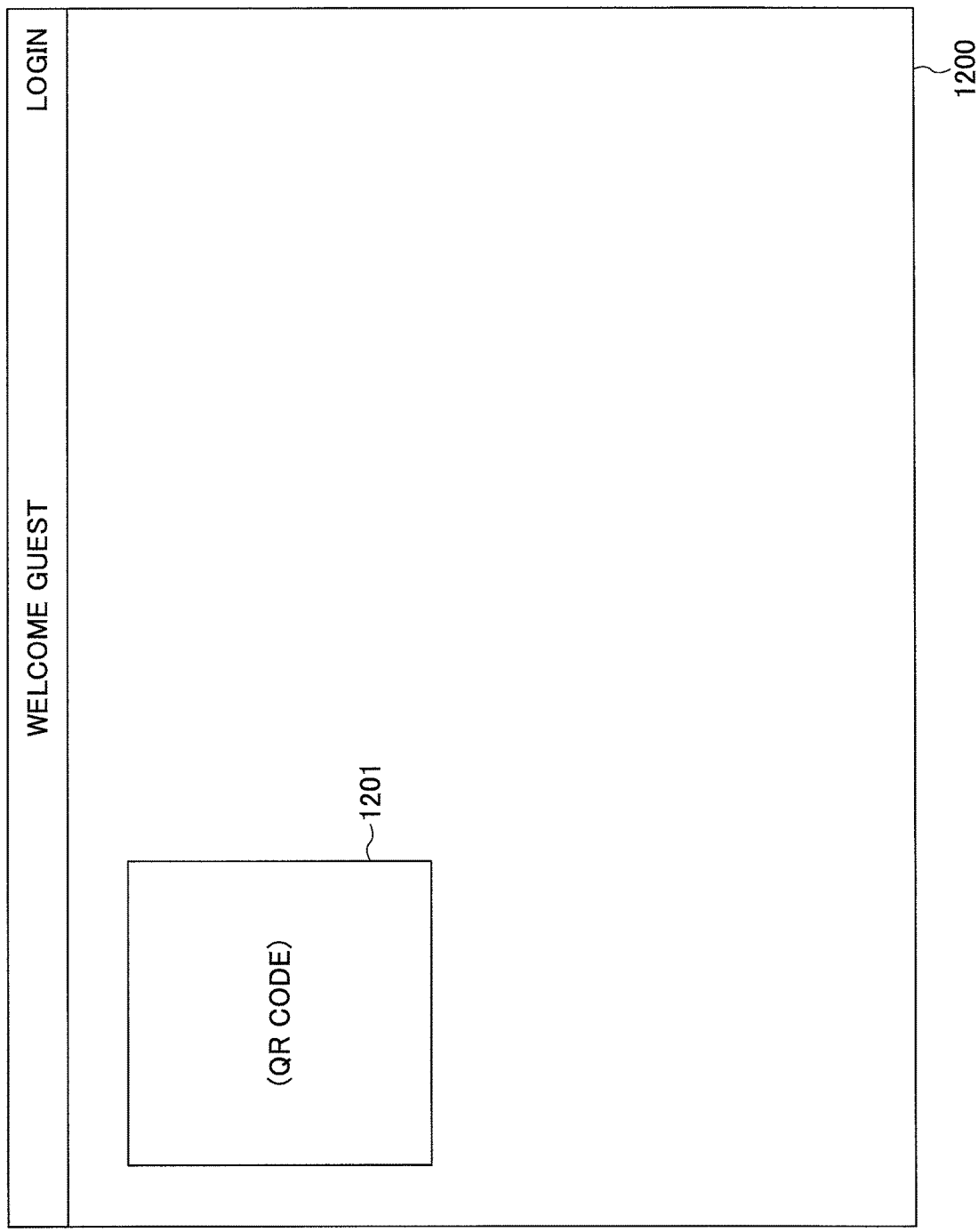
FIG. 15 illustrates an exemplary image of a QR code displayed on a MFP.

According to the sequence diagram illustrated in FIG. 11, the smart phone 11 can display a file stored in the information accumulating apparatus 10. The user selects a file from the smartphone 11 and reads the QR code 1201 as illustrated in FIG. 15 displayed in the MFP 15, by which the printing is performed. Thus, the smartphone 11 can acquire the converted file having the file format which can be printed by the MFP 15 from the information accumulating apparatus 10. The smartphone 11 sends the converted file acquired from the information accumulating apparatus 10 as a print file to the MFP 15 as a print file. Thus, the smartphone 11 can cause the MFP 15 to print the converted file.

FIG. 15 illustrates an exemplary image of the QR code displayed on the MFP. Referring to FIG. 15, a case where the QR code 1201 is displayed on a screen 1200 is described. However, a seal of the QR code 1201 may be adhered to, for example, a casing of the MFP 15.

The MFP 15 may store the image data of the QR code 1201 inside the MFP 15 itself. Instead of attaching the seal of the QR code 1201 to the casing of the MFP 15, a seal of the QR code may be attached to a wall of a room in which the MFP 15 is installed. Said differently, the position where the seal is attached to may be anywhere as long as the user can recognize that the QR code 1201 corresponds to the MFP 15.

Figure 16:
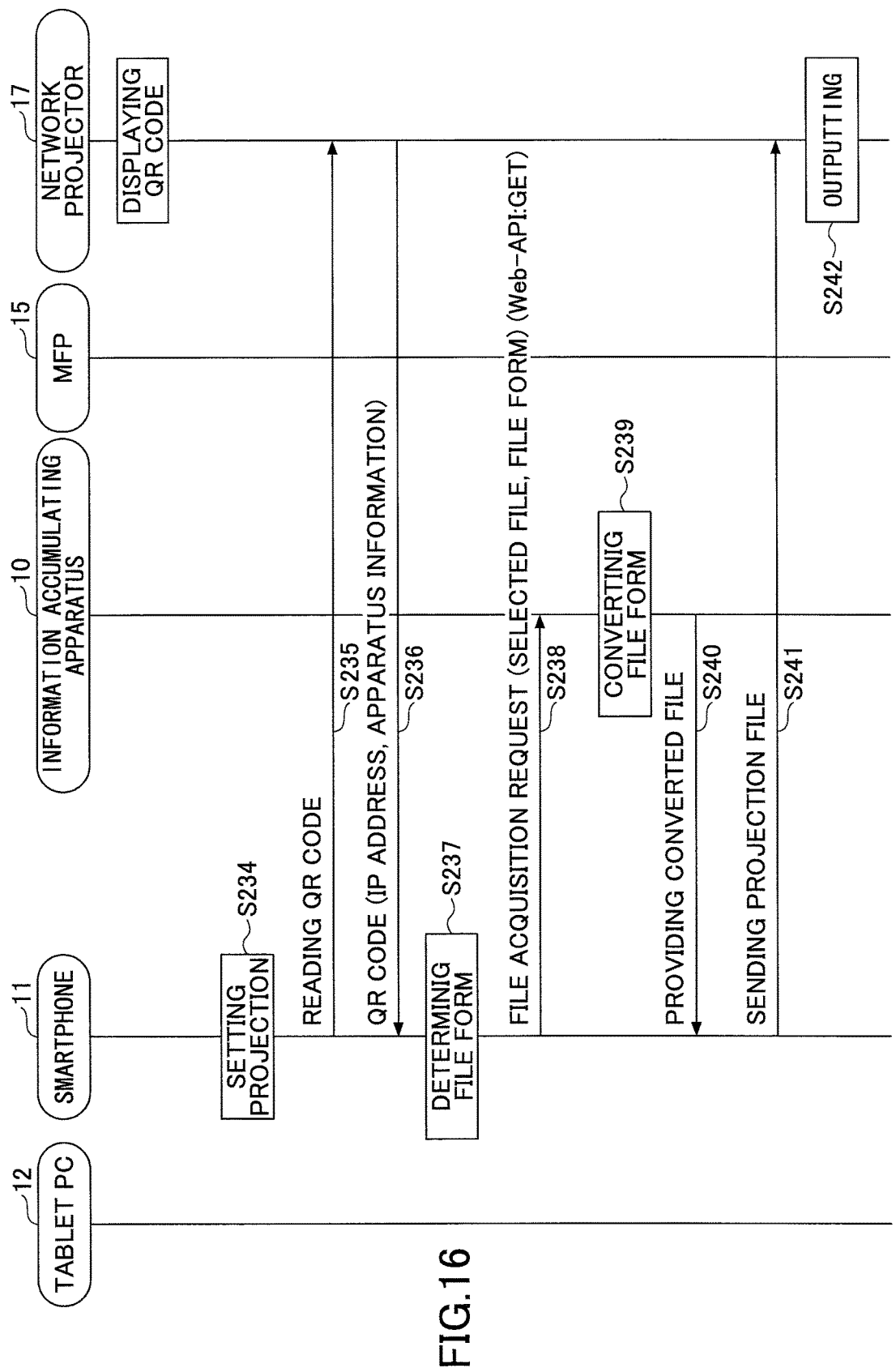
FIG. 16 is an exemplary sequence diagram illustrating processing steps of projection in a collaborate processing system of the embodiment.

Referring to the sequence diagram of FIG. 11, the smartphone 11 is used to acquire the file from the information accumulating apparatus 10 and prints the file using the MFP 15. In the collaboration processing system of the first embodiment, as illustrated in a sequence diagram of FIG. 16, a file may be acquired from the information accumulating apparatus 10 using the smartphone 11, and the acquired file may be projected by the network projector 17. FIG. 16 is an exemplary sequence diagram illustrating printing processes in a collaborate processing system of the first embodiment.

When a button (not illustrated) of "setting projection" is selected on the file list screen 1010, the smartphone 11 displays a projection setup screen in step S234. The user operates the smartphone 11 to set up projection performed by the network projector 17 through the displayed projection setup screen.

For example, a file to be projected by the network projector 17 is selected by the user among the files displayed in FIG. 10. Then, the user selects a "QR" button 1012 to cause the smartphone 11 to display the QR code reading screen 1150 illustrated in, for example, FIG. 12.

In steps S235 and S236, the user operates the smartphone 11 to adjust a positional relationship between the QR code displayed on the network projector 17 and the smartphone 11 so that the QR code imaged by the camera function is displayed on the QR code displaying area 1151 of the QR code reading screen 1150.

The application of the smartphone 11 reads the IP address of the network projector 17, the projector name of the network projector 17, functional information indicative of a projection function provided by the network projector 17, and the type of the network projector 17 as illustrated in FIG. 17 from the QR code imaged by the camera function. FIG. 17 is an exemplary structural view of information read from the QR code.

The application of the smartphone 11 displays a screen indicative of, for example, a download after reading the IP address of the network projector 17 and the functional information indicative of the projection function of the network projector 17 from the QR code.

The timing when the QR code is displayed on the network projector 17 and the timing when the QR code is read from the network projector 17 are not limited to the order illustrated in the sequence diagram of FIG. 16.

In step S237, the application of the smartphone 11 determines a file type as follows depending on the functional information read from the QR code as illustrated in FIG. 14. For example, when the functional information includes projection function, the application of the smartphone 11 determines that the file form is PDF or the like, which can be projected by the network projector 17.

Because the processes of steps S238 to S240 are similar to the processes of steps S208 to S210 of FIG. 11, explanation is omitted. In step S241, the application of the smartphone 11 sends the converted file as a projection file to the network projector 17. A method of sending the projection file to the network projector 17 is, for example, a method of using WebAPI released by the network projector 17 to the public or the like. When the network projector 17 receives the projection file, the network projector 17 projects (outputs) the projection file in step S242.

Figure 18:
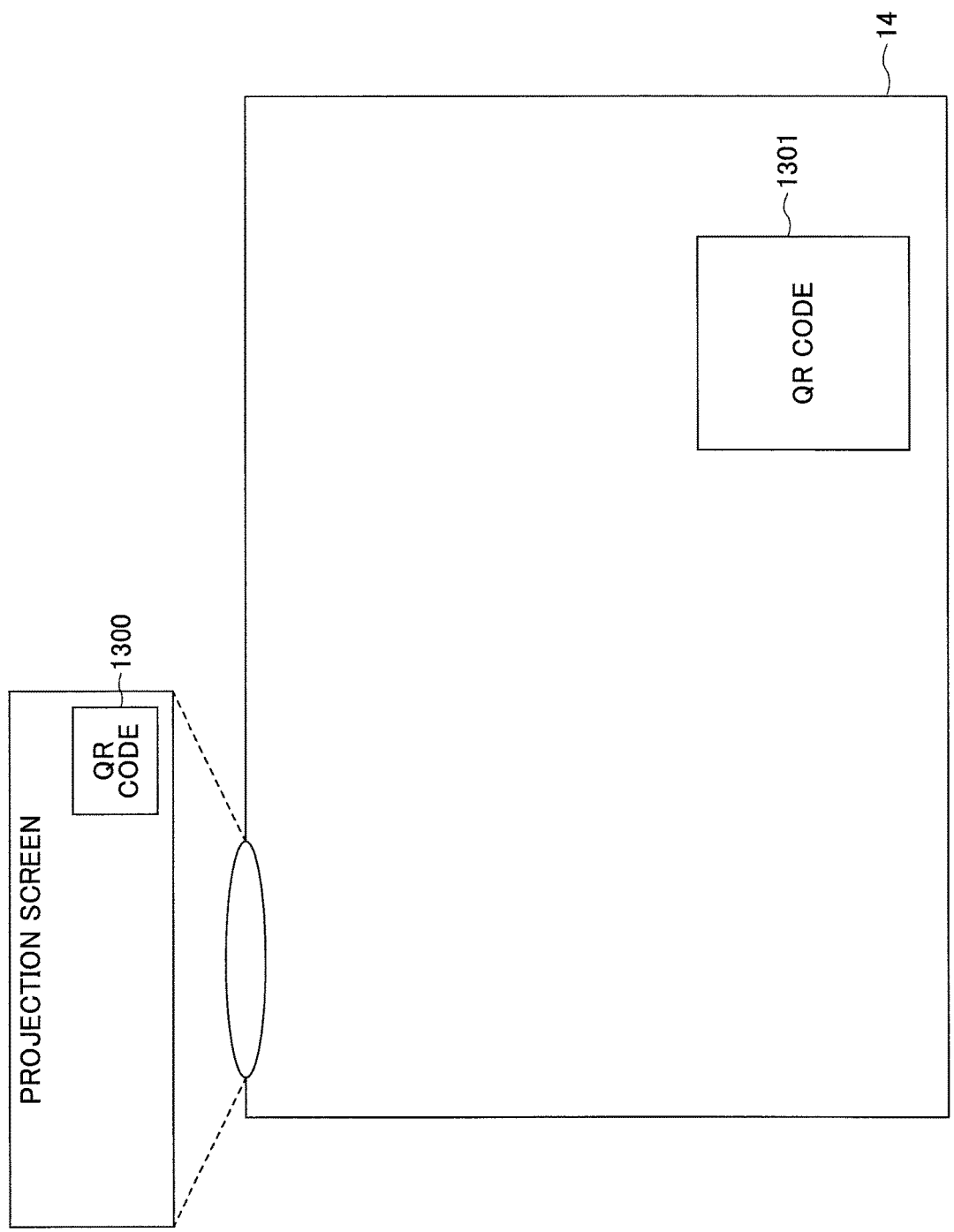
FIG. 18 illustrates an exemplary image of a QR code displayed on a projector.

Referring to FIG. 18, the network projector 17 may project a screen containing a QR code 1300. Alternatively, a QR code 1301 may be attached to the casing of the network projector 17. FIG. 18 illustrates an exemplary image of the QR code displayed on the projector. For example, the network projector 17 can project the QR code 1300 by displaying a QR code display WebUI of the information accumulating apparatus 10 using a Web browser (not illustrated). The network projector 17 may store the image data of the QR code 1300 or acquire the image data from the outside.

Instead of attaching the seal of the QR code 1301 to the casing of the network projector 17, a seal of the QR code 1301 may be attached to a wall of a room in which the network projector 17 is installed. As described, the position where the seal is attached to may be anywhere as long as the user can recognize that the QR code 1301 corresponds to the network projector 17.

Within the first embodiment, in the flowchart illustrated in FIG. 4, the table indicating the convertible data forms as illustrated in FIG. 5 is referred to thereby checking the convertible data forms, to which files stored in the shared folder can be converted. Within the first embodiment, a table indicative of available data forms illustrated in FIG. 19 may be referred to, and the available data forms for each file stored in the shared folder may be checked.

FIG. 19 is an exemplary structural view of a table including the available data forms. The table illustrated in FIG. 19 associates an original data form with an available data form. The "available data form" illustrated in FIG. 19 includes the convertible data form and the converted data form illustrated in FIG. 6.

For example, in the table illustrated in FIG. 19, the file whose original data form is "doc" is associated with the available data forms of "doc, pdf, ps, rpcs, and jpg". Therefore, when the file administrating part 205 refers to the table illustrated in FIG. 19, the file administrating part 205 can check the available data forms of "doc, pdf, ps, rpcs, and jpg", which can be provided when the file has the original data form "doc".

After the file administrating part 205 checks the available data forms for the files stored in the shared folder, the file administrating part 205 creates file information for files and folders stored in the shared folder as illustrated in FIG. 20.

FIG. 20 is another exemplary structural view of file information. In the file information illustrated in FIG. 20, the item "convertible data form" of the file information is changed to "available data form". The item of "available data form" contained in the file information illustrated in FIG. 20 is checked using the table illustrated on FIG. 19.

In step S3 of FIG. 4, the file administrating part 205 refers to the table indicative of the available data form, which can be provided by the information accumulating apparatus 10 as illustrated in FIG. 19, for each file stored in the shared folder. The file administrating part 205 checks the original data form and the available data form for each file stored in the shared folder by referring to the table illustrated in FIG. 19. The available data form is information including the original data form and the convertible data form. For example, when a file has the original data form of "doc", it is possible to provide the file in data forms of "doc, pdf, ps, rpcs, and jpg" from the information accumulating apparatus 10.

Further, the file administrating part 205 creates file information illustrated in FIG. 20 from the checked available data form. Here, the "available data form" is checked from the available data form illustrated in FIG. 19.

In step S4, the file administrating part 205 sends the file information list created in step S3 to the network connecting part 201. In step S6, the application installed in the device performs the processes in steps S7 to S11 for each file information of the files and the folders which are stored in the shared folder as illustrated in FIG. 20 and included in the file information list received from the information accumulating apparatus.

In step S7, the application refers to the item of "folder identifying information" for each file information included in the file information list and determines whether the file information is the folder information. If the file information is the folder information, the application proceeds to step S8 and adds the file information to a display object. Meanwhile, the file information is not the folder information, the application determines whether the file indicated by the file information has a data form processable by the device in step S9. The data form processable by the device depends on the application installed in the device. The expression of "processable" relates to, for example, printing, displaying, projecting, editing or the like.

If it is possible to provide a file having a data form processable by the device, the application adds the file to the display object. By checking files indicated by the entire file information, only available files, which can be provided to the device, can be displayed by the information accumulating apparatus on the device.

<General Overview>

As described above, according to the collaborate processing system 1 of the first embodiment, the information accumulating apparatus provides commonly-used WebAPI to devices and can provide file information to the devices in response to a file information acquisition request from the devices. The information accumulating apparatus 10 has a function of converting a plurality of data forms. In file information to be provided to the device, convertible data form information indicative of a convertible data form, to which the data form of the file can be converted, or available data form information is included. With this, the device determines the file convertible to have the processable data form based on the file information. The file convertible to have the data form processable on the device side can be selected and displayed. Further, the device determines the files having the available data forms, which can be provided by the information accumulating apparatus 10, based on the file information. The file having the processable data form can be selected among the files having the available data forms, and the selected file having the processable data form can be displayed.

Within the first embodiment, it is possible to provide the system, the information processing apparatus, the method of controlling the display, and the program, with which operability is improved.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the system has been described in detail, it should be understood that various changes, substitutions, and alterations could be made thereto without departing from the spirit and scope of the invention.

This application is based upon and claims the benefit of priority of the prior Japanese Patent Application No. 2012-154922, filed on Jul. 10, 2012, and the Japanese Patent Application No. 2013-140032, filed on Jul. 3, 2013, the entire contents of which are incorporated herein by reference.

What is claimed is:

1. A system comprising:
an information accumulating apparatus; and
an information processing apparatus, which has an application installed in the information processing apparatus and is other than the information accumulating apparatus,
wherein the information accumulating apparatus includes a hardware memory and a hardware processor,
wherein the hardware memory is configured to store
a plurality of electronic data files, and
electronic data file information including a convertible data form that is capable of being converted, for each of the plurality of electronic data files,
wherein the hardware processor is configured to
receive an acquisition request for acquiring the electronic data file information corresponding to each of the plurality of electronic data files from the information processing apparatus, and
send the electronic data file information corresponding to each of the plurality of electronic data files to the information processing apparatus in response to a receipt of the received acquisition request,
wherein the application
sends the acquisition request to the information accumulating apparatus,
receives the electronic data file information corresponding to each of the plurality of electronic data files from the information accumulating apparatus in response to a receipt of the sent acquisition request,
determines, based on the convertible data form included in the electronic data file information of each of the plurality of electronic data files and a processable data form processable by the application, at least one processable electronic data file processable by the application from among the plurality of electronic data files,
displays the determined at least one processable electronic data file on a display of the information processing apparatus,
receives a selection of one electronic data file from among the determined at least one processable electronic data file that is displayed,
obtains functional information indicating output functions available of an image output device,
determines a data form based on the obtained functional information of the image output device, and
sends a file acquisition request to acquire the one electronic data file having the data form determined based on the obtained functional information, to the information accumulating apparatus.

2. The system according to claim 1,
wherein the electronic data file information includes a name of a file or a name of a folder.

3. The system according to claim 1,
wherein the hardware processor of the information accumulating apparatus is further configured to
receive an electronic data file acquisition request requested by a user from the information processing apparatus to send a selected electronic data file selected among the determined at least one processable electronic data file through a predefined interface, and convert the selected electronic data file to have the processable data form which is processed by the application, and send the converted electronic data file which is converted to have the processable data form by the converting part to the application.

4. The system according to claim 3,
wherein another application installed in the information processing apparatus processes the converted electronic data file sent from the hardware processor of the information accumulating apparatus.

5. The system according to claim 3,
wherein the predefined interface is WebAPI.

6. The system according to claim 1,
wherein the application determines the determined at least one processable electronic data file in response to an event in which the convertible data form of the determined at least one processable electronic data file matches the processable data form, which can be processed by the application.

7. The system according to claim 1,
wherein the display displays a screen provided for selecting the one electronic data file from among the determined at least one processable electronic data file and including a button for starting processing in the information processing apparatus.

8. The system according to claim 1,
wherein the application obtains the functional information via at least one of optical label recognition, infrared communication, Bluetooth, and NFC.

9. The system according to claim 8,
wherein the application obtains the functional information via a QR code.

10. The system according to claim 1,
wherein the application further obtains an IP address of the image output apparatus.

11. A method of controlling an information processing apparatus which has an application installed in the information processing apparatus and is coupled with an information accumulating apparatus, the method comprising:
sending an acquisition request to the information accumulating apparatus for acquiring electronic data file information including a convertible data form that is capable of being converted, for each of the plurality of electronic data files;
receiving the electronic data file information corresponding to each of the plurality of electronic data files, the electronic data file information being sent from the information accumulating apparatus in response to a receipt of the acquisition request sent by the sending the acquisition request;
determining, based on the convertible data form included in the electronic data file information of each of the plurality of electronic data files and a processable data form processable by the application, at least one processable electronic data file processable by the application from among the plurality of electronic data files;
displaying the electronic data file information corresponding to the determined at least one processable electronic data file on a display of the information processing apparatus;
receiving a selection of one electronic data file from among the determined at least one processable electronic data file that is displayed;
obtaining functional information indicating output functions available of an image output device;
determining a data form based on the obtained functional information of the image output device; and
sending a file acquisition request to acquire the one electronic data file having the data form determined based on the obtained functional information, to the information accumulating apparatus.

12. The method according to claim 11,
wherein the electronic data file information related to the determined at least one processable electronic data file includes a name of a file or a name of a folder.

13. The method according to claim 11, the method of controlling the display further comprising:
sending an electronic data file acquisition request for requesting, by a user from the information processing apparatus to the information accumulating apparatus, to send a selected electronic data file selected by the user among the determined at least one processable electronic data file through a predefined interface, and
receiving a converted electronic data file, which is the selected electronic data file converted by the information accumulating apparatus to the processable data form, which is processed by the application.

14. The method according to claim 13,
wherein the predefined interface is WebAPI.

15. The method of controlling the display according to claim 11,
wherein the display displays a screen provided for selecting the one electronic data file from among the determined at least one processable electronic data file and including a button for starting processing in the information processing apparatus.

16. A non-transitory computer-readable storage medium storing a program for causing a hardware processor included in an information processing apparatus, which has an application installed in the information processing apparatus, to execute a method of controlling the information processing apparatus coupled with an information accumulating apparatus, the method comprising:
sending an acquisition request to the information accumulating apparatus for acquiring electronic data file information including a convertible data form that is capable of being converted, for each of the plurality of electronic data files;
receiving the electronic data file information corresponding to each of the plurality of electronic data files, the electronic data file information being sent from the information accumulating apparatus in response to a receipt of the acquisition request sent by the sending the acquisition request;
determining, based on the convertible data form included in the electronic data file information of each of the plurality of electronic data files and a processable data form processable by the application, at least one processable electronic data file processable by the application from among the plurality of electronic data files
displaying the electronic data file information corresponding to the determined at least one processable electronic data file on a display of the information processing apparatus;
receiving a selection of one electronic data file from among the determined at least one processable electronic data file that is displayed;
obtaining functional information indicating output functions available of an image output device;
determining a data form based on the obtained functional information of the image output device; and
sending a file acquisition request to acquire the one electronic data file having the data form determined based on the obtained functional information, to the information accumulating apparatus.

17. The non-transitory computer-readable storage medium according to claim 16,
wherein the electronic data file information related to the determined at least one processable electronic data file includes a name of a file or a name of a folder.

18. The non-transitory computer-readable storage medium according to claim 16, the method further comprising:
sending an electronic data file acquisition request for requesting, by a user from the information processing apparatus to the information accumulating apparatus, to send a selected electronic data file selected by the user among the determined at least one processable electronic data file through a predefined interface, and
receiving a converted electronic data file, which is the selected electronic data file converted by the information accumulating apparatus to the processable data form, which is processed by the application.

19. The non-transitory computer-readable storage medium according to claim 18,
wherein the predefined interface is WebAPI.

20. The non-transitory computer-readable storage medium according to claim 16,
wherein the display displays a screen provided for selecting the one electronic data file from among the determined at least one processable electronic data file and including a button for starting processing in the information processing apparatus.

* * * * *